INVENTOR.
GUY O. CONNER
BY
Arthur H. Seidel
ATTORNEY.

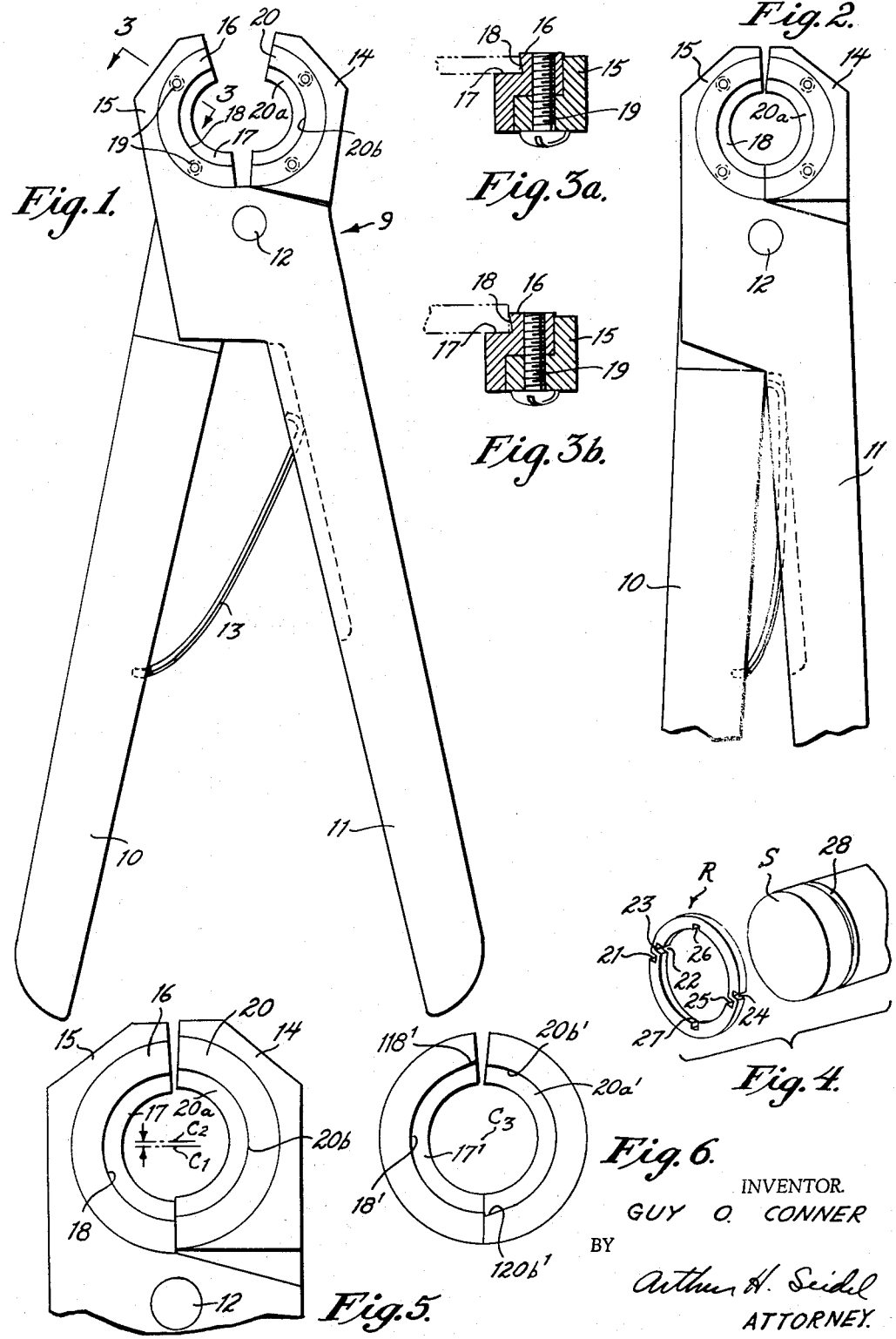

United States Patent Office 3,203,221
Patented Aug. 31, 1965

3,203,221
PLIER-TYPE RETAINING RING ASSEMBLY TOOL
Guy O. Conner, Cleveland, Ohio, assignor to Waldes Kohinoor, Inc., Long Island City, N.Y., a corporation of New York
Filed Aug. 26, 1963, Ser. No. 304,364
6 Claims. (Cl. 72—410)

This invention relates to a tool for applying a retaining ring of the radially constricting type.

In my United States Letters Patent No. 2,888,852 there is disclosed and claimed a non-resiliently deformable locking or retaining ring which is adapted to be constricted radially inward to lock it on a shaft. In so applying rings of this general type, difficulty has been encountered due to the tendency of the ring, when it is constricted, to bind in the jaws of the tool which was used to constrict it. In many instances it was quite difficult to free the tool from the ring. The present invention is directed to a novel tool which avoids this difficulty.

In accordance with one embodiment of the present invention there is provided a pliers-like tool having generally arcuate or semi-circular recesses in opposed jaws for receiving the opposite portions of the locking ring. When these jaws are brought together, the ring is constricted radially onto the shaft to which it is being applied. In accordance with one or more embodiments of the present invention, the recesses in the jaws have their respective ring-engaging side walls slightly offset radially from one another at their adjacent ends so as to facilitate the release of the jaws from the ring after the latter has been constricted. Perferably, also, these ring-engaging side walls of the jaw recesses are tapered so as to insure that the ring is properly located in the tool as it is being applied.

It is the principal object of this invention to provide a novel and improved tool for applying a locking or retaining ring.

It is also an object of this invention to provide such a tool having novel provision for insuring the ready disengagement of the tool from the ring after the latter has been applied.

Another object of this invention is to provide such a tool having novel provision for locating the locking ring securely in the tool as it is being applied.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a top plan view of a tool with its ring-engaging jaws apart;

FIGURE 2 is a similar view of the tool of FIGURE 1 with its jaws together;

FIGURE 3a is a section taken along the line 3—3 in FIGURE 1 showing in phantom a locking ring having an axial thickness less than the depth of the recesses in the tool jaws which receive it;

FIGURE 3b is a view similar to FIGURE 3a showing in phantom a ring having an axial thickness greater than the depth of the recesses in the tool jaws which receive it;

FIGURE 4 is a fragmentary exploded perspective view showing a locking ring and the shaft to which it may be applied;

FIGURE 5 is a fragmentary top plan view showing in exaggerated detail the offset of the centers of semi-circular recesses in the respective jaws of the tool, in accordance with one embodiment of this invention;

FIGURE 6 is a view similar to FIGURE 5 showing a different arrangement in which the side walls of the respective jaw recesses are offset radially at their adjacent ends.

Figure 7:
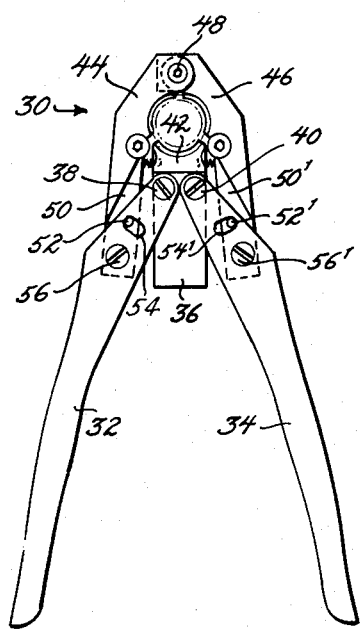
Figure 8:
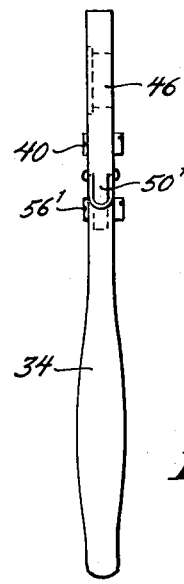
Figures 9, 10:
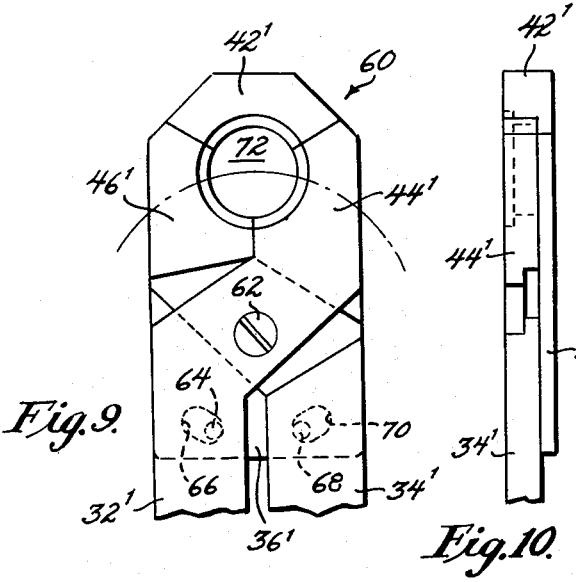
Figure 11:
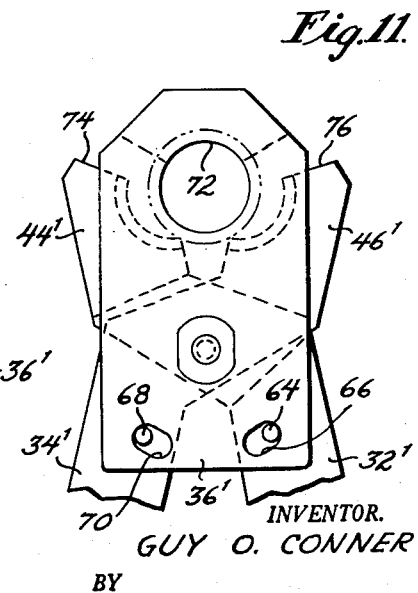

FIGURE 7 is a top plan view of another embodiment.
FIGURE 8 is a side elevation view of the pliers in FIGURE 7.
FIGURE 9 is a plan view of the jaw end of the pliers of another embodiment.
FIGURE 10 is a side elevation view of the pliers of FIGURE 9.
FIGURE 11 is a view similar to FIGURE 9 but showing the jaws open.

Referring to FIGURES 1–3, the tool 9 illustrated therein comprises two handle members 10 and 11 pivotally interconnected at 12 and normally biased apart by a spring 13. These handles carry opposite confronting jaws 14 and 15 while are brought together when the handles 10 and 11 are brought together.

The jaw 15 is provided with a generally semi-circular hard metal insert 16 having a semi-circular recess at the inside of the jaw for receiving a portion of the locking ring which is to be constricted by the tool 9. The insert 16 is secured to the jaw 15 by means of a plurality of screws 19. As shown in FIGURES 3a and 3b, the recess presents a flat bottom face 17, semi-circular in outline, which is engaged by one axial end face of the locking ring. The opposite axial end of the recess is open to receive the ring.

The jaw insert 16 also presents a side wall 18, also semi-circular in outline, for engagement with the outer periphery of the locking ring. As shown clearly in FIGURES 3a and 3b, side wall 18 tapers outward in a direction toward the bottom face 17 of this recess so as to properly locate the ring with respect to the tool, as explained hereinafter.

The opposite jaw 14 has an insert 20 essentially the same as the just described insert 16. The insert 20 presents a semi-circular recess having a face 20a for receiving and engaging the opposite half of the locking ring and having an arcuate side wall 20b similar to the side wall 18 on the other jaw insert 16.

The locking ring R which is to be applied by the tool may be of the type shown in FIGURE 4. Ring R is normally circular in outline. At one location on its periphery, ring R is provided with a pair of slots or notches 21 and 22, extending inward respectively from the outer and inner peripheral edges of the ring. These slots are positioned close to one another and are separated from one another by a thin, readily deformable connected segment 23 which is disposed between them.

A similar pair of slots 24 and 25 are provided on the ring R at a location substantially diametrically opposite the slots 21 and 22. Midway between the pairs of slots are single slots 26 and 27 which are open at the inner periphery of the ring.

The ring R initially has an inside diameter slightly greater than the diameter of the shaft S on which it is to be mounted. The ring is slid endwise over the shaft until it is at a peripheral groove 28 in the shaft. Then the operator manipulates the tool 9 to constrict the ring R tightly into the shaft groove 28. The inner diameter of the jaws correspond to the outer diameter of ring R in its constricted position.

FIGURE 5 shows an exaggerated detail of one embodiment of the present tool in which the jaws, when closed, have the side walls 18 and 20b of their respective ring-receiving recesses offset radially from one another at their adjacent ends. As shown in FIGURE 5, the semi-circular recess 17 on the tool jaw 15 is concentric about a first center $C_1$, whereas the corresponding recess 20a on the other jaw is concentric about another center $C_2$ which is offset radially from the first center $C_1$ in a direction away from the pivot 12 of the tool.

As a consequence, the arcuate side walls 18 and 20$b$ of these ring-engaging recesses are similarly offset radially from one another at their adjacent ends. In actual practice, an offset of .003 inch has been found to give excellent results. During deformation of a ring R, the side walls 18 and 20$b$ move through an arcuate path about the longitudinal axis of pin member 12 which interconnects the handle members 10 and 11. Since the side walls 18 and 20$b$ are moving through an arcuate path, they tend to bite into the ring R thereby making it difficult to separate the jaws after the ring R has been deformed to the desired extent. Because of the above mentioned offset, the jaws release without difficulty from the locking ring R after the ring R has been crimped in place onto the shaft S.

FIGURE 6 shows an alternative jaw construction in the tool for the same purpose. In this figure, the elements of the tool are given the same reference numerals as before, with a "prime" added.

In FIGURE 6, the semi-circular faces 17′ and 20$a$′ and their respective ring-engaging side walls 18 and 20$b$′ are concentric about a common center $C_3$ throughout their respective arcuate extents except at one end of each. At its upper end in FIGURE 6, the arcuate side wall 18′ is cut away at 118′, so that it is offset radially from the adjacent end of the arcuate side wall 20$b$′ on the other jaw. Similarly, at its lower end in FIGURE 6 the arcuate side wall 20$b$′ on the jaw 14 is cut away at 120$b$′ so that it is offset from the adjacent end of the arcuate side wall 18′ on jaw 15. Due to this offset disposition of the respective side walls of the jaw recesses at their adjacent ends, the tool releases easily from the locking ring, as in the first-described embodiment.

As already mentioned the ring-engaging side walls of the respective jaw recesses are tapered. As shown in FIGURE 3$a$, when the thickness of the ring is less than the depth of the jaw recesses, this taper causes the ring to be forced flat against the bottom walls of the jaw recesses as the ring is being constricted. Alternatively, as shown in FIGURE 3$b$, when the ring thickness is greater than the depth of the jaw recesses, the outer edge of this tapered side wall tends to bite into the periphery of the ring. In either case, the ring is securely and properly positioned with respect to the tool jaws as the crimping operation proceeds to completion.

In FIGURE 7, there is illustrated another embodiment of the present invention designated generally as 30. The pliers 30 include a pair of handles 32 and 34 pivotably connected at their upper ends to a plate 36 by bolts 38 and 40, respectively. Plate 36 terminates at its upper end in an arcuate jaw 42 having an arcuate extent of approximately 120°.

A pair of arcuate jaws 44 and 46 are pivotably connected to each other by a pin member 48. Each of the jaws 44 and 46 have an arcuate extent of approximately 120°. Jaw 44 is provided with an elongated extension 50 of reduced thickness. The lowermost end of the extension 50 extends into a recess in the handle 32 and is pivotably connected thereto by means of a bolt 56 or the like. Handle 32 adjacent its upper end is provided with an elongated aperture 54 into which extends a pin 52 on the extension 50.

Jaw 46 is provided with an extension 50′ corresponding to the extension 50. Extension 50′ is pivotably connected to handle 34 by means of bolt 56′. Pin 52′ on extension 50′ extends into elongated aperture 54′ on handle 34. Each of the jaws 44 and 46 are spring biased away from the jaw 42 by means of coil springs extending therebetween. Thus, pliers 30 includes a stationary jaw 42 and jaws 44 and 46 which are pivotably mounted for movement toward and away from each other.

Each of the jaws 42, 44 and 46 may be provided with inserts corresponding to inserts 16 and 20. With the pliers 9, the ring is gripped by the jaws at diametrically opposite arcuate contact areas. With the pliers 30, the ring is contacted by three substantially equally spaced apart arcuate contact areas, whereby the ring will be more accurately concentric with the axis of a shaft about which the ring is constricted.

The elongated apertures 54 and 54′ lie generally along an arc whose radius coincides with the pin member 48. The extent of the opening and closing movement of the handles 32 and 34 is limited to the length of the elongated apertures 54 and 54′. Accordingly, the pliers 30 will not accidentally become separated and excess radial constricting pressure cannot be applied to the retaining ring. Hence, the retaining ring is less likely to be deformed more than necessary.

In FIGURES 9–11, there is disclosed another embodiment of the present invention designated generally as 60. The pliers 60 is similar to the pliers 30 except as will be made clear hereinafter. Hence, pliers 60 is provided with corresponding primed numerals on corresponding elements wherever applicable.

The handles 32′ and 34′ are pivotably coupled to each other and the plate 36′ by a bolt 62 or the like. Plate 36′ is provided with elongated apertures 66 and 70. An integral pin 64 on handle 32′ extends into the aperture 66. An integral pin 68 on the handle 34′ extends into the aperture 70. The cooperation of the pins and elongated apertures on the pliers 60 is substantially identical with the corresponding structure in the pliers 30.

The plate 36′ is provided with an aperture 72 extending therethrough. The upper end of the plate 36′ terminates in a jaw 42′ having a downwardly extending arcuate recess coextensive with approximately one third of the aperture 72. Each of the jaws 44′ and 46′ likewise are provided with an arcuate recess corresponding to approximately one third of the periphery of the aperture 72. Hence, the jaws 42′, 44′ and 46′ are provided with arcuate recesses which cooperate to define an annular recess concentric with the aperture 72. The jaws 44′ and 46′ terminate in end faces 74 and 76, respectively, lying along a radius of the annular recess and adapted to abuttingly engage a mating face on the jaw 42′.

The jaws 42′, 44′, and 46′ are otherwise identical with the corresponding structure on the pliers 30 and likewise cooperate to radially constrict a retaining ring in the same manner. Thus, it will be seen that each of the embodiments of the present invention include a pair of jaws movable toward and away from each other, with the jaws having confronting arcuate recesses for receiving opposite portions of a retaining ring, with the recesses having curved side walls for engagement with the periphery other ring which taper outwardly in a direction toward the bottom of the respective recesses.

While certain presently preferred embodiments of the present invention have been described in detail and illustrated in the accompanying drawing, it is to be understood that various modifications, omissions and refinements which depart from the disclosed embodiments may be adopted without departing from the spirit and scope of this invention. For example, the ring engaging recesses may be provided in the jaws themselves, in which case the jaw inserts will be omitted. Also, the tools of the present invention are applicable to locking rings which differ from the particular ring shown in FIGURE 4 and from the ring shown in my aforementioned U.S. Patent 2,888,852.

I claim:

1. A tool for constricting a non-resiliently deformable locking ring comprising at least two jaws pivotably coupled together, said jaws having confronting arcuate recesses on one face for receiving adjacent portions of a ring, said recesses being defined by curved side walls tapering outwardly in a direction from said one face toward a bottom wall of said recess, said side walls lying in the same plane, each bottom wall being curved in the same manner as its associated side wall, each jaw having a confronting face at one end of its recess which lies generally along a radius of the arc defined by said recesses in the closed position of said jaws, and adjacent ends of said recesses being offset from each other to facilitate release of the jaws from the ring.

2. A tool in accordance with claim 1 wherein said offset is approximately .003 inch.

3. A tool in accordance with claim 6 including a plate-like member connected to said third jaw and pivotably connected to each of said first-mentioned jaws.

4. The tool of claim 1 wherein said side walls extend substantially along circular arcs having equal radii and having their respective centers offset from one another.

5. The tool of claim 1 wherein said side walls extend substantially along circular arcs of equal radii and with a common center for most of their respective extents, one of said side walls at one end being offset radially from the adjacent end of the other side wall, said other side wall at its opposite end being offset radially from the neighboring end of said one side wall.

6. A tool in accordance with claim 1 wherein the arcuate extent of said recesses is approximately 120°, and a third jaw stationary with respect to said first-mentioned jaws, said third jaw having an arcuate recess corresponding to said first-mentioned recesses.

References Cited by the Examiner

UNITED STATES PATENTS

| | | | |
|---|---|---|---|
| 753,048 | 2/04 | Des Moineaux | 81—428 X |
| 1,353,718 | 9/20 | Buresch | 81—303 X |
| 1,830,855 | 11/41 | Russell | 81—15 |
| 2,602,357 | 7/52 | Nash. | |
| 2,608,116 | 8/52 | Kulp. | |
| 2,806,394 | 9/57 | Briegel | 81—415 X |

FOREIGN PATENTS 1,152,800    2/58    France.

WILLIAM FELDMAN, *Primary Examiner.*

MILTON S. MEHR, *Examiner.*